Sept. 18, 1923.
H. B. FOGEL
FILLER FOR VEHICLE TIRES
Filed June 28, 1921
1,468,105
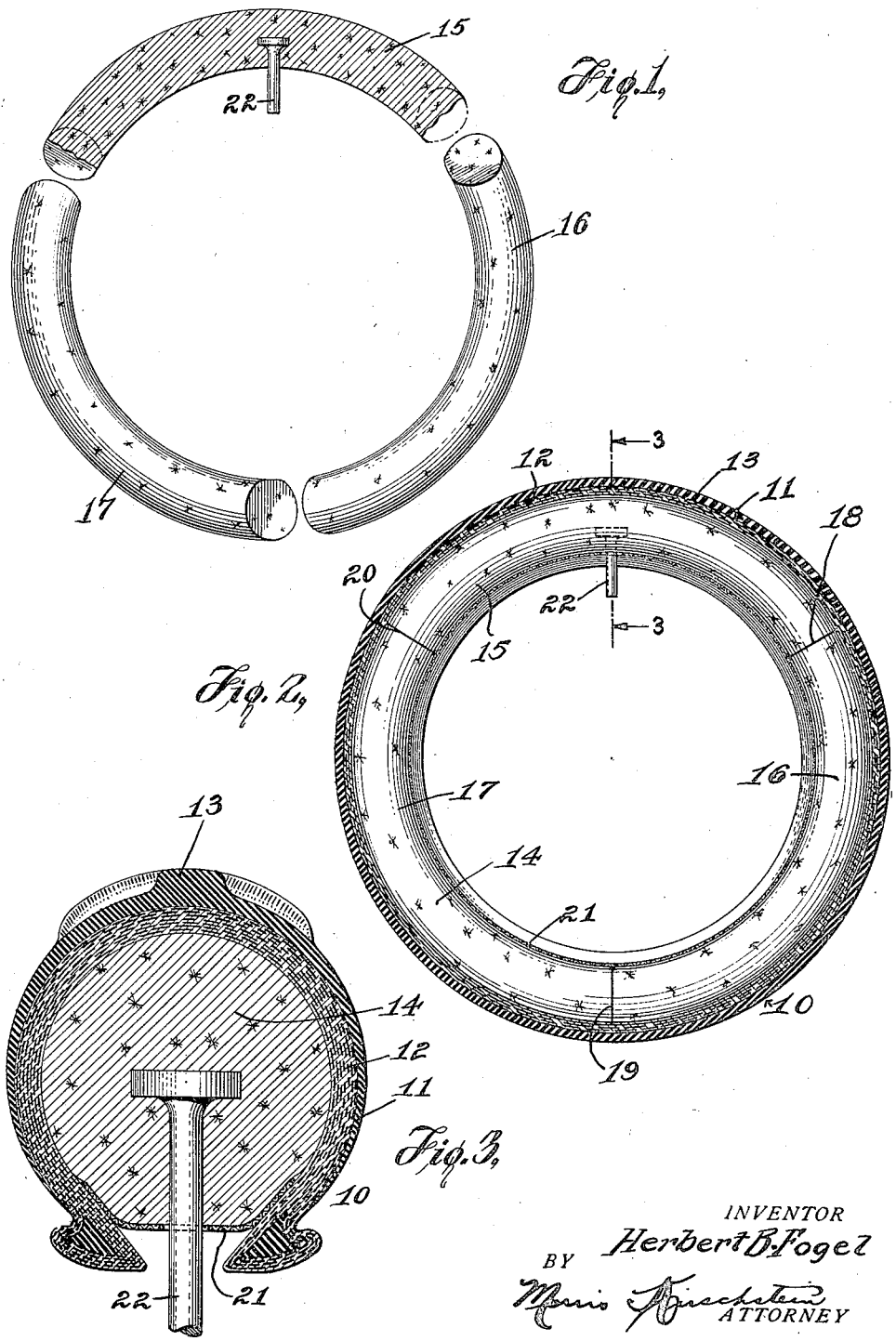
INVENTOR
BY Herbert B. Fogel
ATTORNEY Patented Sept. 18, 1923.

1,468,105

UNITED STATES PATENT OFFICE.

HERBERT B. FOGEL, OF PHILADELPHIA, PENNSYLVANIA.

FILLER FOR VEHICLE TIRES.

Application filed June 28, 1921. Serial No. 480,983.

*To all whom it may concern:*

Be it known that HERBERT B. FOGEL, citizen of the United States, and resident of the city of Philadelphia, county of Philadelphia, and State of Pennsylvania, has invented certain new and useful Improvements in Fillers for Vehicle Tires, of which the following is a specification.

This invention relates to vehicle tires. One object thereto is to provide a device of the character described in which the pneumatic tube or air cushioning means is replaced by a filler of puncture-proof material having the desired resilient properties, and which filler shall be of such construction as to permit the same being readily portable from place to place and easily assembled within the tire casing.

Another object of this invention is to provide a filler of the character described of sectional construction so as to permit compact shipment and easy assembly or disassembly within the tire casing.

A further object is to provide a tire filler adapted to replace the usual pneumatic tubes made in sections adapted to be assembled in the tire casing and having means to prevent relative motion between the tire casing and the filler when assembled.

The invention accordingly consists in the features of construction, combinations of elements and arrangement of parts which will be exemplified in the construction hereinafter described and of which the scope of application will be indicated in the following claim.

In the accompanying drawings, in which is shown one of various possible illustrative embodiments of this invention, Fig. 1 shows a tire filler embodying this invention, disassembled;

Fig. 2 is a side elevational view with the parts in section showing the tire filler assembled within a tire casing; and Fig. 3 is a detailed cross-sectional view cut along line 3—3 of Fig. 2.

Referring in detail to the drawing, 10 indicates the shoe comprising the usual outer rubber casing 11 and the inner layers of duck or canvas 12. 13 indicates the usual tread of the shoe. The body or resilient cushioning means of the tire is shown at 14 and comprises a filler of cork or other such light and somewhat resilient material. This filler is preferably made in a plurality of sections such as 15, 16 and 17 of arcuate shape so as to form a complete annular solid member to provide the body or filler for the tire. In assembling the filler, one of such sections is slipped into the shoe at a time and these suitably arranged end to end until they form the complete filler. The parts are of course of such size and shape as to fit snugly against each other end to end as shown at 18, 19 and 20, so that when the casing is closed by the bottom flap 21, there is held within the shoe a complete annular filler member which replaces the pneumatic tube. Means are provided to prevent movement of the filler as assembled within the shoe and to this end one of the sections such as 15 is provided with a stem preferably of metal adapted to enter in the usual opening in the rim for the valve stem of the usual pneumatic tube.

It will be noted that a filler such as the one herein described may be easily carried from place to place, the several sections being nested one in the other and tied together and placed in a bag if desired. The filler being originally in sectional disassembled condition is readily assembled within the casing and no time or effort lost in trying to insert a complete solid filler thereinto. The filler is further capable of ready disassembly and removal from the casing if desired for the purpose of replacing one of the sections or for repairs.

It will thus be seen that there is provided apparatus in which the several objects of this invention are achieved and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

In a vehicle tire in combination with a shoe adapted for engagement with a rim, a filler for said shoe comprising a plurality of independent sections, of solid light resilient material, the adjacent ends of the respective sections abutting throughout the entire surfaces of said ends, one of said sections being adapted to be wedged in between two adjacent sections, thus forming the complete annular filler which of itself will remain in position in direct engagement with the interior of the shoe, and means for locking the filler sections against movement within the casing comprising a stem provided with an enlarged head portion embedded in one of said sections, the stem projecting inwardly to engage the rim.

Signed at New York city, in the county of New York and State of New York, this 24th day of June 1921.

HERBERT B. FOGEL.